April 10, 1962 — E. J. ALM — 3,029,066
TIRE SPREADING APPARATUS
Filed Nov. 4, 1959 — 2 Sheets-Sheet 1
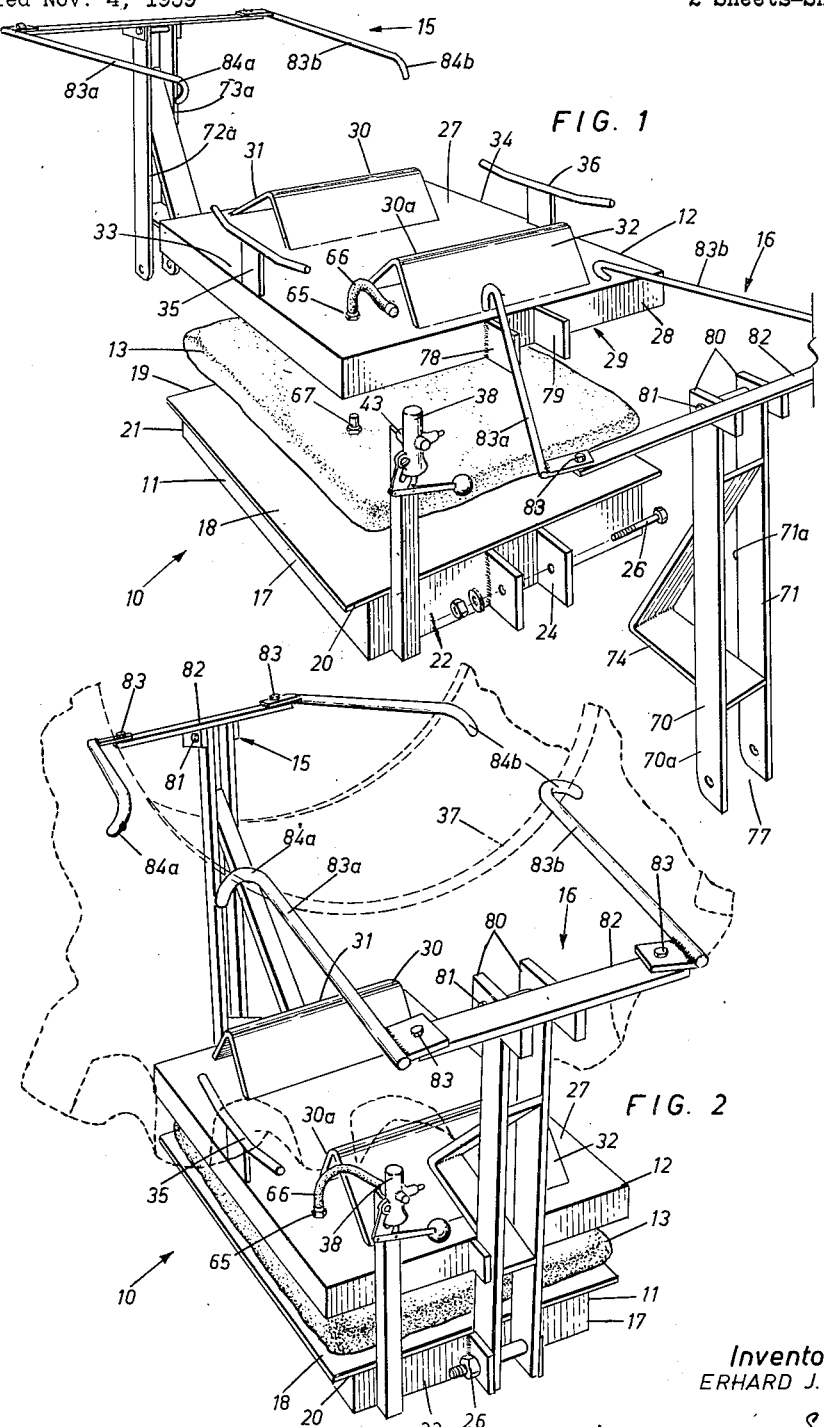
Inventor
ERHARD J. ALM
by: *[signature]*
Attorney

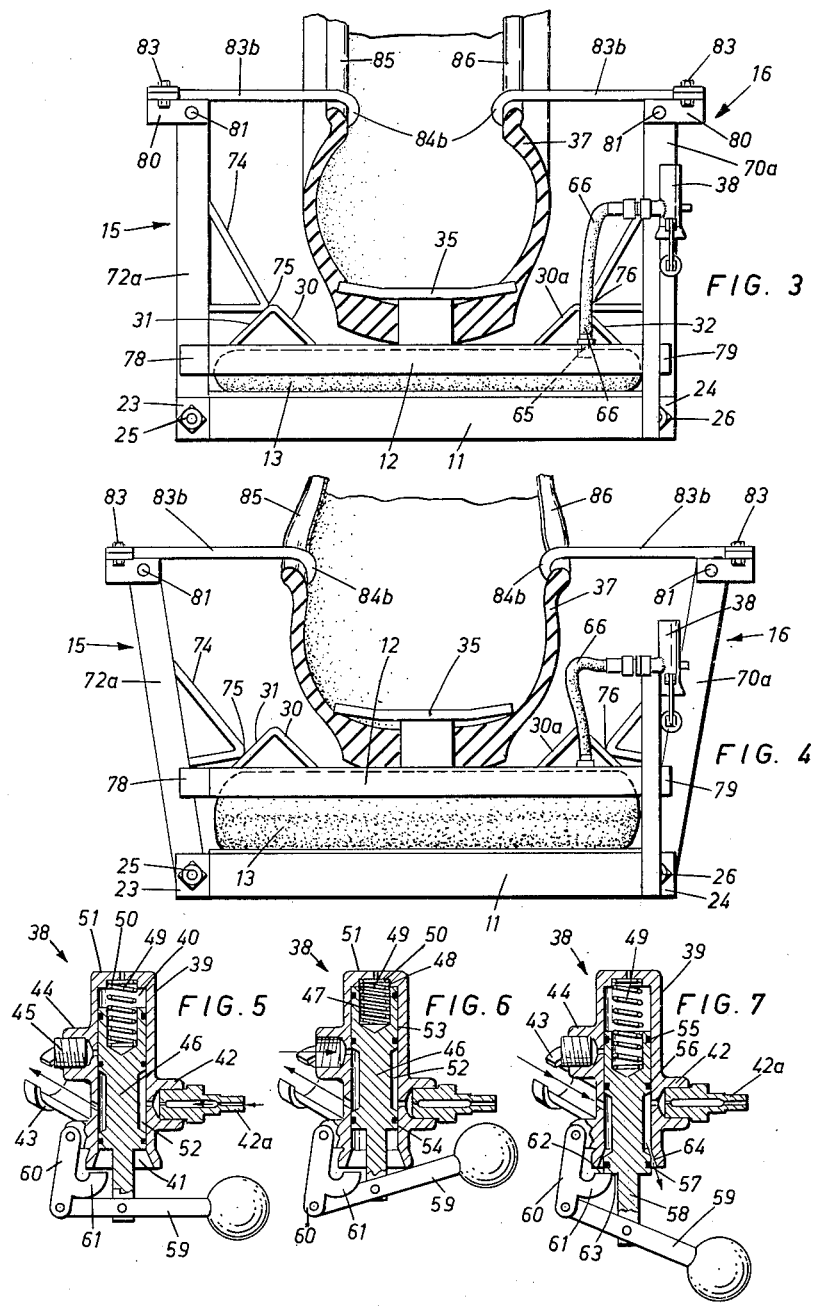

United States Patent Office 3,029,066
Patented Apr. 10, 1962

3,029,066
TIRE SPREADING APPARATUS
Erhard J. Alm, Toronto, Ontario, Canada, assignor to Vulcan Equipment Co., Ltd., Toronto, Ontario, Canada
Filed Nov. 4, 1959, Ser. No. 850,962
18 Claims. (Cl. 254—50.3)

This invention relates to improvements in apparatus for spreading the beads of a tire casing in tire repair and inspection operations.

The principal object of this invention is to provide automatic or self-actuating tire casing spreading apparatus.

Another important object of this invention is to provide a tire spreader which can be operated with low air pressure, yet is powerful enough to effectively spread the beads of a tire casing up to the heaviest ply.

Still another object is to provide a tire spreader which will sit low on a support surface making the tire repair operation much easier.

Still another and very important object is to provide a greatly simplified tire spreader which is both economical to produce and requires little maintenance, the replacement of the operative components of the apparatus being extremely low.

The principal feature of this invention resides in providing a tire casing spreading apparatus comprising a fixed platform formation which is overlain by a substantially coextensive tire casing supporting movable platform formation, there being disposed between the aforesaid fixed and movable platform formation means for displacing the movable platform uniformly upwardly, and tire bead engaging arm formations swingably carried by the fixed platform formation at opposite sides and extending upwardly and over said movable platform formation, the movable platform formation and arm formations being provided with cooperating cam formations arranged to uniformly urge the arm formations outwardly under upward displacement of the movable platform formation whereby the tire casing supported on the movable platform, with the tire bead engaging arms secured over the bead portions thereof, is automatically opened out for the purpose of inspection or repair.

More particularly, the means for displacing the movable platform uniformly upwardly is an inflatable expansible pressure member substantially flat lying and having an area substantially coextensive with the surface of the movable platform formation.

Another important feature resides in providing a depending wall or flange about the periphery of the movable platform for locating the expansible pressure member in substantially coextensive relation therewith.

Still another feature of the invention resides in constructing the arm formations to present vertical guide surfaces to the movable platform formation, the latter platform formation presenting guide formations to the guiding surfaces of each of the arm formations whereby vertical registration of the arms and movable platform is maintained.

Another feature resides in providing an expansible pressure member as a separate, easily removable component, which component is the sole source of pressure and the only part that is subject to deterioration, such pressure member being of low cost and hence readily replaceable.

Still another feature resides in providing a valve device for inflating and readily deflating the expansible pressure member at rates consistent with the efficiency of operation.

These and other objects and features will be mentioned in the following specification which is to be read in conjunction with the sheet of drawings in which:

FIGURE 1 is a perspective exploded view of a tire spreading apparatus constructed in accordance with the invention;

FIGURE 2 is a perspective view of a fully assembled tire spreading apparatus at a stage in the operation of spreading the beads of a tire casing;

FIGURE 3 is a front elevational view of the tire spreader of FIGURES 1 and 2 illustrating the initial position of the movable platform formation and arm formations as applied to a tire casing mounted on the apparatus;

FIGURE 4 is a front elevational view illustrating the next to final position of the movable platform formation and arm formations;

FIGURES 5, 6 and 7 are vertical mid sectional views of a preferred valve device for controlling the operation of the inflatable pressure member to accomplish substantially instantaneous inflation and deflation of the pressure member.

With reference to FIGURES 1, 2, 3 and 4 of the drawings, the tire spreading apparatus or tire spreader designated at 10, constructed in accordance with the invention, comprises essentially a base structure or lower fixed platform formation 11, an upper overlying movable platform formation 12, a flexible expansible inflatable pressure member 13, disposed between the fixed and movable platform formations 11 and 12 and upstanding tire bead engaging arm formations 15 and 16 hingedly connected to the base structure at opposite sides thereof.

The base structure 11 is preferably constructed of steel plate and comprises a generally rectangular frame or wall 17 surmounted by an overlying generally rectangular horizontal flat plate 18 secured to wall 17 as by welding, the side edges 19 and 20 of plate 18 being arranged flush with the side wall portions 21 and 22, respectively, of the frame 17.

Secured intermediately of the extent of side wall portions 21 and 22 are apertured lug formations 23 and 24, respectively, which are formed to receive threaded bolt and nut formations 25 and 26, respectively, which together with lug formations 23 and 24 serve as the pivots or hinges supporting the upstanding arms 15 and 16, respectively.

The overlying movable platform formation 12 is preferably constructed of steel plate and comprises a generally rectangular flat plate 27 substantially co-extensive with plate 18 of the base structure 11 and is provided with a depending wall formation 28 therearound and secured thereto as by welding to define a recess 29 therebeneath for the reception of the inflatable pressure member 13.

Mounted upon plate 27 at each side thereof next adjacent arms 15 and 16, are cam formations 30 and 30a formed of steel plate bent into the form of a V and secured as by welding in parallel disposition to present inclined camming surfaces 31 and 32, respectively, extending from their lowermost limits next adjacent to arms 15 and 16 upwardly and inwardly at a selected angle.

Upstanding at the opposite edges 33 and 34 of plate 27 are T-shaped brackets or stop formations 35 and 36 which serve to locate on platform formation 12, a tire casing as shown in broken lines at 37 in FIGURE 2 and in solid lines in FIGURES 3 and 4.

Mounted at one edge of movable platform 12 is a valve mechanism 38 for the inflation and deflation of pressure member 13. Valve mechanism 38 as best seen in FIGURES 5, 6 and 7 comprises essentially a valve body 39 having a central bore 40 open at one end 41.

Formed integral with valve body 39 and communicating with central bore 40 is an internally threaded conduit formation 42 having a suitable pressure responsive valve device 42a threaded therein, for manual connection to a source of compressed air.

A second integral conduit formation 43 of large internal cross section opens into said central bore 40 substantially diametrically opposite to the conduit formation 42 and is adapted to be connected to the inflatable pressure member 13.

A third integral internally threaded conduit formation 44 is provided in axial spaced relation with conduit formation 43 for permanent connection with a source of compressed air if so desired. If such connection is made, the aforementioned valve device 42a may be selected to serve as a safety blowout device, for limiting the pressure in the inflatable pressure member 13.

When not connected to a source of compressed air, conduit formation 44 is fitted with a sealing threaded plug 45.

Mounted to reciprocate in bore 40 is an elongated piston head 46 provided with an axial bore formation 47 at the upper end 48 to receive a locating spring member 49 seated as at 50 in the upper end 51 of valve body 39.

Piston head 46 is provided with an annular recess 52 intermediately of its extent to define an annular chamber with the walls of the piston bore 40. The piston surfaces 53 and 54 contacting the bore 40 at each end of the piston head 46 are provided with the suitable sealing O-rings 55, 56 and 57, respectively.

Piston head 46 is provided with a depending rod 58 pivotally connected at its lower end to manually operable handle formation 59 which is in turn, connected by link member 60 to the valve body 39. Link member 60 has a projection 61 intermediately of its length extending beneath piston head 46 and presents a stop surface 62 to the lower end surface 63 thereof to limit the descent of piston head 46 as illustrated in FIGURE 7.

The open end 41 in valve body 39 is chamfered as at 64 to define upon movement of the piston head 46 to its lowermost position illustrated in FIGURE 7 an annular orifice communicating with the atmosphere.

With reference again, to FIGURES 5, 6 and 7, it will be appreciated that FIGURE 5 illustrates the neutral position of the valve mechanism 38, that is, the position in which the annular chamber or recess 52 is providing communication between the conduit formation 42 fitted with the manually operable valve device 42a and conduit formation 43 communicating with the pressure member 13.

This neutral position is automatically ascertained by selecting a spring member 48 having a maximum extended position to urge piston head 46 to the neutral position.

It will be appreciated that with piston head 46 so disposed, the pressure member 13 may be inflated with a suitable manually connectable compressed air device.

With piston head 46 moved to the position illustrated in FIGURE 6, that is the permanent compressed-air-connection inlet position, the inflatable pressure member 13 will be brought into communication with the permanent compressed air source through conduit formation 44, annular chamber 52 and conduit 43. With the piston head 46 moved to the position illustrated in FIGURE 6, it will be seen that the conduit formation 42, provided with the valve device 42a, is in communication with the system and that a suitable valve device 42a can be selected to serve as a blowout valve to limit the pressure applied to the inflatable pressure member 13.

In the position illustrated in FIGURE 7, the deflation, or exhaust position, of inflatable pressure member 13, the piston head 46 is shown at the bottom of its stroke providing communication between inflatable pressure member 13 and the atmosphere by way of conduit formation 43, annular chamber 52 and the orifice defined by the chamfer 64 and piston head 46.

It will also be appreciated that the effective cross sectional area of the flow passages are such that deflation will be accomplished rapidly whereby efficiency of operation is achieved.

Preferably, the plate 27 of upper platform formation 12 is provided with an aperture 65 through which a flexible hose connection 66 extends, flexible hose connection 66 being connected at one end by a suitable coupling to conduit formation 43 of valve mechanism 38 and at the other end by a suitable coupling to a conduit formation 67 carried by and in communication with inflatable pressure member 13.

Pressure member 13 is preferably in the form of a flat-lying air bag defined by over-lying substantially coextensive walls of flexible expansible material joined together about their peripheral edges. In practice, the air bag is constructed of a vulcanized length of flat-lying butyl rubber tubing sealed upon its end edges and wrapped with a substantially non-extensible fabric in the form of sheets or strips. With this construction the expanded configuration of the inner expansible member is controlled and prevents blowout over a range of useful air pressures.

The flat lying area of the inflatable pressure member 13 is substantially coextensive with the overlying area of the plate 27 and under inflation acts to displace platform 12 uniformly upwardly. The depending walls 28 of plate 27 serve to contain as well as reigster the inflatable pressure member 13 with the plate 27.

With this simple arrangement it will be readily appreciated that the pressure member 13 can be readily disconnected from or connected to the apparatus and also, because of the relatively inexpensive construction, can be replaced at reasonably low cost.

The upstanding tire-bead-engaging arm formations 15 and 16 are illustrated as being of identical construction. For purposes of clarity, the numerals designating their structure will be identical where understanding will not be impaired. Each arm formation 15 and 16 comprises elongated parallel steel bars 70 and 71 which are secured together in spaced parallel relation intermediately of their ends by the spaced ends of inwardly projecting V-shaped members 74, as by welding, the apices 75 and 76 of the V-shaped members 74 being arranged to contact the camming surfaces 31 and 32, respectively, of cam formations 30 and 30a mounted on the platform formation 12, the consequence of which will be later described.

The bars 70 and 71 are secured in spaced relation by the V-shaped members 74 to fit within the apertured lug formations 23, 24, respectively at their lower ends 77, the lower ends being apertured to receive the bolt shanks of bolt and nut formations 25 and 26, respectively, whereby the arms 15 and 16 are pivotally connected to the base structure 11.

The flush relation between edges 19 and 20 of plate 18 and wall portions 21 and 22 of the frame 17 serve as stops to limit swinging movement of arm formations 15 and 16 beyond the vertical and to position them at the initial stage of operation.

The flat bars 70, 71 are disposed with their flat surfaces 70a, 71a, 72a and 73a at right angles to the plane of displacement of the movable platform formation 12 which constitute substantially parallel vertical guide surfaces. The movable platform formation 12 is provided with spaced horizontally extending lug formations 78 and 79 which are arranged to slidably engage with the guiding surfaces aforementioned.

In this manner vertical registration of the platform formations 11 and 12, pressure member 13 and arm formations 15 and 16 are maintained over the range of displacement of the movable platform formation 12.

Pivotally connected by lug formations 80 to arm formations 15 and 16 by suitable pivot pins 81 are transversely extending bars 82, the bars 82 pivotally supporting, by suitable pins 83, elongated rods 83a and 83b bent at their outer ends to present hook formations 84a and 84b, downwardly turned. The rods 83a and 83b extend inwardly over the movable platform formation 12 a selected distance to engage hooks 84a and 84b over the beads of a tire casing. By reason of the pivotal connection of the rods 83a and 83b and transversely extending bars 82, the hooks 84a and 84b can move towards and away from one another and rods 83a and 83b will rock about the pivot axis defined by pivot pins 83 to accommodate the relative displacement of the components upon outward movement of arm formations 15 and 16 in a tire bead spreading operation.

It will be appreciated that dimensions of the components of the apparatus will be selected to accommodate tire casings over a given range of sizes. To illustrate, however, what forces can be developed with the tire spreading apparatus 10, with the pressure member 13 having the approximate length and width dimensions of twelve inches by twenty five inches and with a source of compressed air at 30 p.s.i., a resultant force of approximately 9000 lbs. can be developed. This is sufficient, for example, to spread the beads of a 12 ply truck tire casing.

With reference to FIGURES 3 and 4 of the drawings, a tire casing designated at 37 is mounted upon the upper platform formation 12 with the tire casing tread portions located and anchored by the T-shaped projections 35 and 36 upstanding from the upper surface of platform formation 12.

The hooks 84a and 84b are then engaged over the bead portions 85 and 86 of the tire casing 37 with the arm formations 15 and 16 located substantially in a vertical plane.

In this disposition the apices 75 and 76 of the V-shaped member 74 or cam followers are arranged to contact the camming surfaces 31, 32, respectively at substantially their uppermost limits.

With the valve mechanism 38 actuated to connect the inflatable pressure member 13 to a source of compressed air, the platform 12 is displaced substantially upwardly uniformly which causes the V-shaped members 74 to ride down the camming surfaces 31, 32 thereby displacing the arm formations 15 and 16 substantially uniformly outwardly to an inclined position. This action results in the spreading of the beads of tire casing 37 as illustrated in FIGURE 4, whereupon inspection or repair can be carried out.

It will thus be appreciated that a tire spreader constructed in accordance with the invention may be comprised of relatively few components of simple construction which can develop forces sufficient to open even the heaviest tire available. Moreover, this construction is relatively inexpensive, as compared with comparable devices on the market.

While the preferred embodiment of the invention has been illustrated and described herein, modifications in size, dimension and variations in structure to accomplish the spreading of the beads of tire casings over a range of sizes may be made without departing from the spirit and scope of the invention as defined in the appended claims.

The embodiments of the invention in which an exclusive property or privilege is claimed are defined as follows:

1. A tire spreader comprising a fixed platform, a movable platform overlying said fixed platform, inflatable means disposed between said fixed and movable platforms and inflatable to displace said movable platform upwardly, tire bead engaging means swingably carried by said fixed platform at opposite sides, and means operable under displacement of said movable platform by said means disposed between said fixed and movable platforms upwardly for urging said tire bead engaging means apart.

2. A tire spreader comprising a lower platform formation, an upper platform formation overlying said lower platform formation, inflatable means disposed between said upper and lower platform formations and inflatable to displace said upper platform formation substantially uniformly upwardly above said lower platform formation, a pair of tire bead engaging arm formations upstanding at opposite sides of said lower platform formation and pivotally connected thereto to swing outwardly, and means operable by said upper platform formation under displacement by inflation of said inflatable means for urging said tire bead engaging arm formations uniformly outwardly.

3. A tire spreader according to claim 2 wherein said inflatable means comprises an inflatable expansible pressure member.

4. A tire spreader according to claim 3 in which said inflatable pressure member has a broad flat-lying configuration in its uninflated state and is substantially co-extensive with the abutting surface of said upper platform formation.

5. A tire spreader according to claim 4 wherein said lower platform formation comprises a base structure surmounted by a substantially flat plate member and said upper platform formation comprises essentially a substantially flat plate member.

6. A tire spreader according to claim 5 wherein said substantially flat plate member defining the upper platform formation has a depending wall formation therearound for locating said inflatable pressure member thereunder.

7. A tire spreader according to claim 2 wherein said upper platform formation presents guide formations to said upstanding arm formations and said arm formations present vertically extending guide surfaces to said guide formations whereby under displacement, vertical registration of said movable platform member and arm formation is maintained.

8. A tire spreader comprising a lower platform formation, an upper platform formation overlying said lower platform formation, inflatable means disposed between said upper and lower platform formations, and inflatable to displace said upper platform formation substantially uniformly upwardly, a pair of arm formations upstanding at opposite sides of said platform formations and pivotally connected at their lower ends to said lower platform formation to swing outwardly, tire bead engaging means carried by each of said arm formations at their upper ends and extending inwardly of said upper platform formation and thereabove, and cooperative camming means carried by each of said platform and arm formations, said camming means having a configuration such that under displacement of said upper platform formation uniformly upwardly, said arm formations are urged to swing uniformly outwardly.

9. A tire spreader comprising a base structure presenting a substantially flat supporting surface, a broad flat-lying expansible inflatable pressure member disposed flatwise on said surface, a platform formation substantially co-extensive with said broad flat-lying inflatable pressure member and overlying same, said pressure member being inflatable to displace said platform formation substantially uniformly upwardly, a pair of tire bead engaging arm formations upstanding at opposite sides of said base structure and each hinged thereto to swing from a substantially upright position to an outwardly inclined position, and means operable by said platform, under inflation of said inflatable pressure member to displace said platform formation upwardly, to uniformly swing said arm formations from said upright positions to said inclined positions.

10. A tire spreader comprising a base structure presenting an inflatable pressure member supporting surface, a broad flat-lying inflatable pressure member disposed flatwise on said surface, a platform formation substantially co-extensive with said broad flat-lying inflatable pressure member and overlying same, said pressure member being inflatable to displace said platform formation substantially uniformly upwardly, a pair of swingable arm formations upstanding at opposite sides of said base structure and pivotally connected thereto at their lower ends, hook formations carried by each of said arm formations and extending inwardly of said arm formations for engaging the bead formations of said tire casing, cam formations upstanding from said platform formations at each side thereof next adjacent to said arm formations and cam follower formations carried by said arm formations, said cam follower formations being arranged to contact said first-mentioned cam formations upon inflation of said inflatable pressure member and upward displacement of said arm formations to uniformly urge said arm formations outwardly, whereby the bead portions of a tire casing are adapted to be spread apart.

11. A tire spreader according to claim 10 wherein said base structure comprises a flat plate member mounted upon a support and said platform comprises a flat plate member having a peripheral depending wall formation therearound locating said flat-lying inflatable pressure member thereunder.

12. A tire spreader according to claim 11 wherein stop formations are upstanding at the sides opposite to said arm formations for locating a tire casing over said platform formation.

13. A tire spreader according to claim 10 wherein said platform formation is provided with an aperture therethrough, a valve device for controlling said inflatable pressure member, and a flexible conduit member extending through said aperture and connected to said valve device at one end and to said inflatable pressure member at the other end.

14. A tire spreader according to claim 13 wherein said valve device is operable to connect said inflatable pressure member to a source of compressed air for inflation and to the atmosphere for deflation.

15. A tire spreader according to claim 10 wherein said arm formations each present vertical guide surfaces to the movable platform formation, said movable platform member being provided with flanges slidably engaging said vertical guide surfaces whereby, under displacement registration of said movable platform and arm formations is maintained.

16. A tire spreader according to claim 10 wherein said hook formations each comprise a pair of spaced elongated hooks extending inwardly of the upper ends of said arm formations, means pivotally supporting each pair of elongated hooks for movement towards and away from one another, and means pivotally connecting said last-mentioned means to the upper ends of said arm formations for rocking movement.

17. A tire spreader according to claim 10 wherein said cam formations mounted on said platform formation present camming surfaces inclining upwardly and inwardly from their lower limits next adjacent the arm formations, and said arm formations are provided with a rigid cam follower member arranged to contact said inclining surfaces when a tire casing is mounted on said platform formation.

18. A tire casing spreader comprising a support frame presenting a lower substantially horizontal platform, an upper substantially horizontal platform having a depending wall formation therearound and overlying said lower platform, a substantially flat-lying inflatable pressure member disposed between said upper and lower platforms and lying within said depending wall formation, the area of said flat-lying inflatable pressure member being substantially co-extensive with the abutting surface of said overlying platform and inflatable to substantially displace said platform uniformly upwardly, a pair of arm formations upstanding at opposite sides of said lower platform and pivotally connected thereto to swing from a substantially vertical position to an outwardly inclined position, tire bead engaging hook formations swingably connected to said arm formations and extending inwardly over said upper platform, cam formations mounted on said upper platform at each side next adjacent to each arm formation and cam follower means carried by each arm formation, said aforesaid cam formations and cam follower means having a size, spacing and configuration arranged to displace said arm formation outwardly under upward displacement of said upper platform, with a tire casing disposed over said upper platform and said tire bead engaging hook formations disposed over the bead portions of the tire casing.

References Cited in the file of this patent
UNITED STATES PATENTS

| | | |
|---|---|---|
| 1,908,311 | Branick | May 9, 1933 |
| 2,375,595 | Stoehr | May 8, 1945 |
| 2,766,006 | Kraft | Oct. 9, 1956 |